(No Model.) 3 Sheets—Sheet 1.

W. R. FEE.
SPLIT PULLEY.

No. 367,509. Patented Aug. 2, 1887.

Attest
E. M. Harmon
A. L. Herringer

Inventor
William R. Fee
per Wm. Hubbell Fisher,
Atty.

(No Model.) 3 Sheets—Sheet 2.
W. R. FEE.
SPLIT PULLEY.
No. 367,509. Patented Aug. 2, 1887.
Fig. 6.
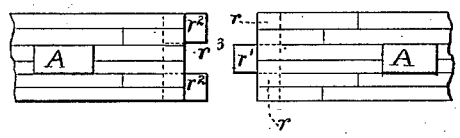
Fig. 7.
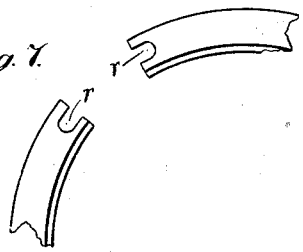
Fig. 8.
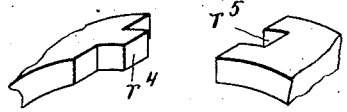
Fig. 5.
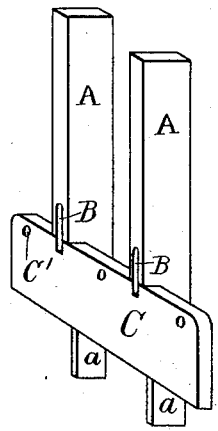
Fig. 9.
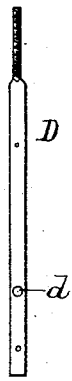
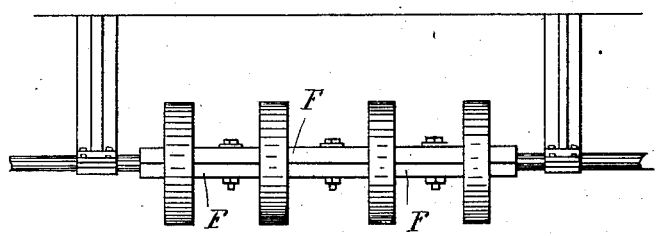
Fig. 10.
Attest
E. W. Harmon
A. L. Herrlinger
Inventor
William R. Fee,
per Wm. Hubbell Fisher,
Atty.

(No Model.)

3 Sheets—Sheet 3.

W. R. FEE.
SPLIT PULLEY.

No. 367,509. Patented Aug. 2, 1887.

Attest
E. M. Harmon.
A. L. Heurlinger.

Inventor
William R. Fee,
per Wm. Hubbell Fisher,
Atty.

UNITED STATES PATENT OFFICE.

WILLIAM R. FEE, OF CINCINNATI, OHIO.

SPLIT PULLEY.

SPECIFICATION forming part of Letters Patent No. 367,509, dated August 2, 1887.

Application filed March 11, 1887. Serial No. 230,505. (No model.)

*To all whom it may concern:*

Be it known that I, WILLIAM R. FEE, a resident of Cincinnati, in the county of Hamilton, State of Ohio, have invented certain new and useful Improvements in Split Pulleys, of which the following is a specification.

The various features of my invention and the advantages resulting from their use, conjointly or otherwise, will be apparent from the following description.

Figure 1:
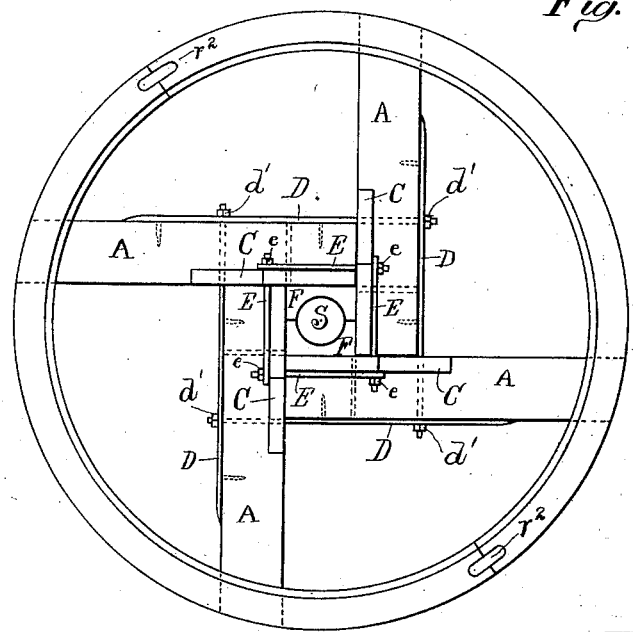
Figure 3:
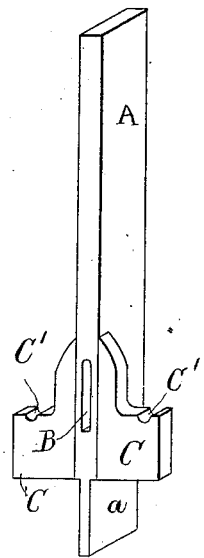
Figure 2:
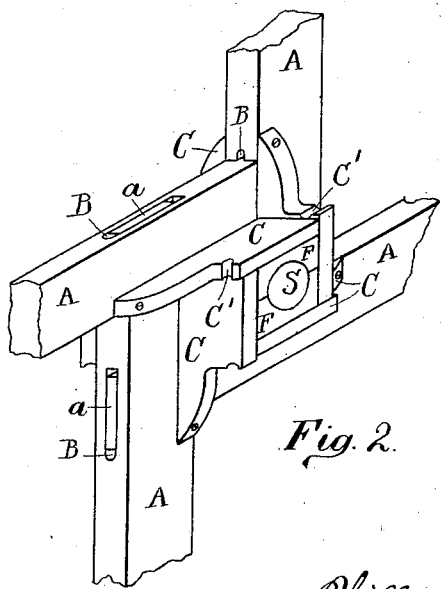
Figure 4:
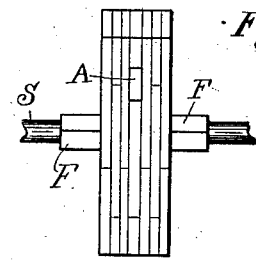
Figure 11:
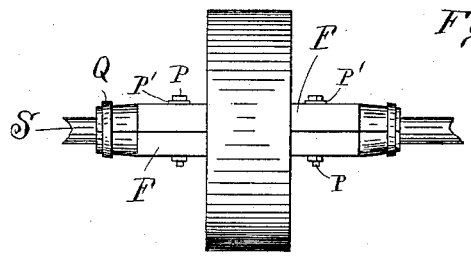
Figure 12:
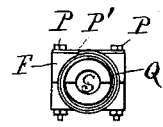
Figure 13:

In the accompanying drawings, forming part of this specification, Figure 1 is an elevation of a pulley embodying my improvements. Fig. 2 is a perspective view of the central part of my pulley, showing the hub and the relation of the spokes or arms of the pulley to each other. In this figure, in order to more fully show certain features of my invention, the clamping-bands are not shown and the bushing is cut off even with the hub. Fig. 3 is a perspective view of one of the pulley-arms detached from the pulley. Fig. 4 is an edge view on a reduced scale of my pulley, showing the projecting bushing and shaft. Fig. 5 is a perspective view of a double arm for use in broad pulleys. Figs. 6 and 7 are respectively top and edge views of the rim, illustrating certain details in construction. Fig. 8 shows in perspective one mode of joining the two halves of the rim. Fig. 9 is an elevation of one of the straps binding the central part of the pulley. Fig. 10 illustrates several pulleys attached to a shaft on the same long bushing. Figs. 11 and 12 illustrate one mode of clamping the bushing independently to the shaft, the figures being respectively side and end elevations. Fig. 13 is a view of the ring shown in Figs. 11 and 12.

The pulley is preferably provided with four arms, A, which are all similar to each other. The inner end of each arm is provided with a tenon, *a*. This tenon is preferably integral with the arm to which it belongs. A groove or mortise, B, is channeled through the arm above the tenon. Each arm A is also provided at its inner end with two projecting flanges or ears, C, which are formed with or rigidly secured to their respective arms by any suitable means. The flanges C are preferably provided with grooves C', for a purpose to be explained hereinafter. The rim of the pulley is made in two equal parts, to which the arms are attached. The arms do not occupy the position of radii of the circle, but pass to the side of the center, forming a square or rectangle at the center. The tenon *a* of each arm fits in the mortise B of one of the adjacent arms, and receives the tenon *a* of the other adjacent arm in its own mortise B. This arrangement is well shown in Figs. 1 and 3. The mortises B are slightly longer than the width of the tenons *a*, and permit a slight movement to and from the center of the circle.

To hold the arms A together at the center of the pulley, I provide the straps D.

A strap, D, is preferably fastened to the edge of each arm, preferably by screws, as shown by dotted lines in Fig. 1. The end of this strap passes through the mortise B of the adjacent arm, with the tenon to which it is attached, and projects through an opening, *d*, in the strap D of that adjacent arm. The end of the strap is screw-threaded and carries the clamping-nut *d'*. In place of the nut and male screw-thread, any other suitable clamping and tightening device may be employed. Each arm is provided with a strap, D, and when all are united, the straps D form a band surrounding the central hub formed by the arms A. For the sake of strength and solidity, I also preferably employ a set of straps, E, on each side of the pulley. Where the grooves C' of the flanges C are present, as they preferably are, to prevent the straps from slipping, the said straps E fit in these grooves C'. The straps are suitably held together, preferably by the nuts *e*, and form a band surrounding the flanges C similar to the band formed by the straps D. The straps E on both sides of the pulley may be omitted, as may also the flanges C; but their use adds much to the strength of the pulley, and to the adhesion of the pulley to the shaft.

The mortise B being, as already mentioned, slightly longer than the width of tenons *a*, a slight movement of the inner ends of the arms A toward and from the center is possible. When the nuts on the several straps D and E are loosened, the arms A may be moved outwardly and the polygonal space between the arms increased, and when the nuts are clamped down tight the central space is correspondingly diminished. This movement at the center need only be very slight for the purposes of the pulley, and does not interfere with the insertion of the arms at the rim.

Within the space between the arms at the center of the pulley the bushings F are placed. The outer surfaces of these bushings are shaped to conform to the outline of the space in which they are placed, while their inner surfaces are curved to adapt them to shaft S. The bushings F are preferably much longer than the pulley is wide, and project on both sides, as shown in Fig. 4. With the bushings much extended, several pulleys may be clamped to the shaft on the same bushings, as shown in Fig. 10.

While ordinarily the clamping at the hub of the pulley is sufficient to secure the bushing to the shaft, it sometimes becomes necessary, in the case of a large pulley especially, to clamp the bushing to the shaft independently of the pulley. This I accomplish by passing bolts P through the bushing on each side of the shaft, as shown in Figs. 10, 11, and 12. The heads of these bolts bear on the iron strap P'. Two or more of these bolts are placed on each side of the pulley.

To give additional security against the bushing slipping on the shaft, I turn the ends of the bushing, giving them a taper, as shown in Fig. 11. On this taper portion I force a hoop or band made of hoop-iron or other suitable material. This hoop or band Q is made of one continuous piece of metal coiled, placed on the shaft, and then riveted, forming a band, as shown in Figs. 12 and 13. The two outer layers of the coil only are riveted or otherwise secured to each other, the remaining coils being free. A band constructed in this way can be placed on or taken off the pulley while on the shaft and while the shaft is in its position, which is not the case with an ordinary iron ring or band. It also adds additional strength.

The preferred form of joint for the ends of the rim is shown in Figs. 1, 4, 6, and 7. A transverse channel, $r$, is cut in the end of each half of the rim in such positions that they lie opposite each other when the two parts of the rim are brought together. In the center of the channel $r$ of one half a tenon, $r'$, is glued. This tenon $r'$ fits snugly in its channel $r$, and projects beyond the end of the half-rim, and when the two halves are brought together it fits into the center of the channel $r$ in the other half of the rim. This arrangement will prevent radial displacement. To prevent lateral displacement of the joint, I also secure in the channel of the second half two tenons, $r^2$, similar to the tenon $r'$, and located at the sides of the channel, so as to form a slot, $r^3$, between them, into which the tenon $r'$ is received, while the tenons $r^2$ embrace the tenon $r'$ and fit in the groove $r$ beside it. When other means than that already described is employed for preventing radial displacement, I preferably make the ends of the two halves of the rim as shown in Fig. 8—that is, one half is provided with a tongue, $r^4$, which is received into a slot, $r^5$, in the other half.

By loosening the nuts holding together the straps, the pulley may be separated into its two halves. In this way it may be applied to the shaft at any point in the same way as ordinary split pulleys, but where it is possible to slip the pulley over the shaft it is not necessary to divide it. The pulley is first slipped onto the shaft, the bushings being removed. The nuts $a$ and $e$ are now loosened, the arms A slightly separated in the manner already described. This gives sufficient space to insert the bushings F in position between the shaft and the arms. The nuts $d'$ and $e'$ are now screwed up, and thus clamp the pulley firmly to the shaft.

The principal features of my device possessing advantages over other pulleys, and more particularly its advantages over other split pulleys of my invention are, first, the firm attachment of the several arms of the pulley by means of the interlocking tenons and mortises; second, the extension of the arms laterally to form a veritable hub; third, the device for preventing lateral displacement of the two halves of the rim; fourth, the device for preventing radial displacement of the two halves of the rim, and, fifth, the combination of the devices for preventing lateral and radial displacement of the two parts of the rim.

While the various features of my invention are preferably employed together, one or more of said features may be used without the remainder, and in so far as applicable one or more of said features may be used with pulleys of kinds other than that specifically herein described.

What I claim as new, and desire to secure by Letters Patent, is—

1. A pulley provided with a series of arms, A, each arm having a tenon, $a$, and a mortise, B, to receive the tenon $a$ of an adjacent arm, the mortises B being longer than the width of their respective tenons $a$, and the arms interlocking, so as to form a polygonal figure at the center of the pulley, and means for clamping the arms together and reducing the size of the polygonal figure, substantially as described.

2. A pulley provided with a series of arms, A, each arm having a tenon, $a$, and a mortise, B, to receive the tenon $a$ of an adjacent arm, the mortises B being wider than their respective tenons $a$, and the arms interlocking, so as to form a polygonal figure at the center of the pulley, and the straps D, adapted to the edges of the arms A, and extending through the mortise B and through the openings $d$, and the nuts $d'$, clamping the straps together, substantially as set forth.

3. In a pulley, the arms A, arranged to form a polygonal figure at the center of the pulley and provided with lateral extensions, and means for holding the arms together, as and for the purposes set forth.

4. In a pulley, the combination of the arms

A, interlocking by means of tenons $a$ and mortises B, and arranged to form a polygonal figure at the center of the pulley and provided with lateral extensions, and means for clamping the arms together, substantially as set forth.

5. In a pulley, the combination of the arms A, interlocking by means of tenons $a$ and mortises B, and arranged to form a polygonal figure at the center of the pulley, and provided with lateral extensions, and the clamp formed by the connecting-straps D and nuts $d'$, and the clamps formed by the connecting-straps E and nuts $e$, substantially as set forth.

6. In a split pulley provided with a split bushing, and the band Q, composed of coils, the two outer layers of coil only being riveted, clamping the bushing to the shaft, substantially as specified.

7. The combination of a shaft, a split bushing, and the coiled ring Q, substantially as and for the purposes specified.

WILLIAM R. FEE.

Witnesses:
O. M. HILL,
W. S. CHRISTOPHER.